United States Patent Office 3,497,941
Patented Mar. 3, 1970

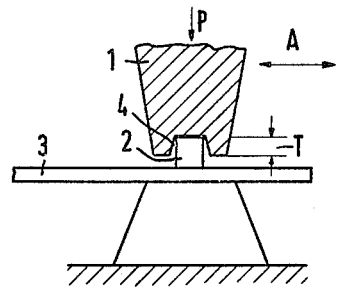
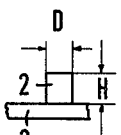
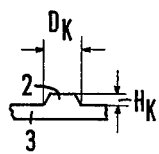
Fig. 1a  Fig. 1b  Fig. 1c
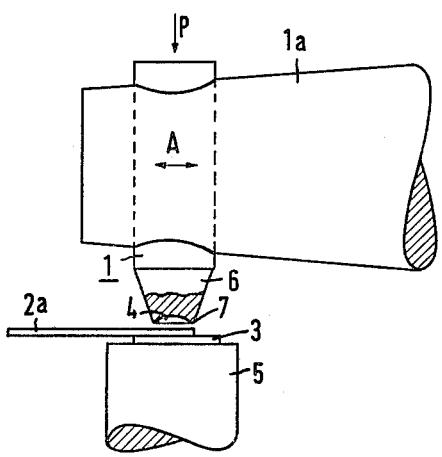
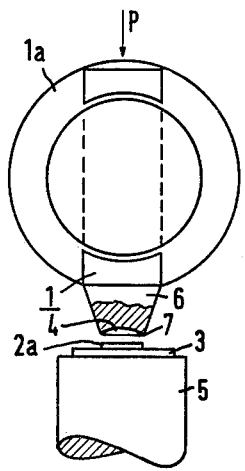
Fig. 2  Fig. 3
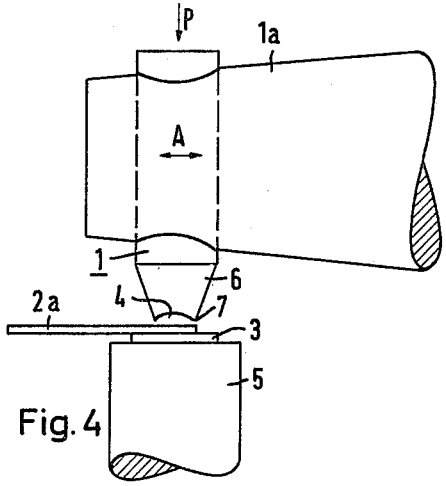
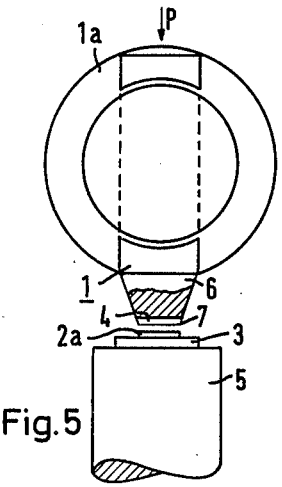
Fig. 4  Fig. 5

3,497,941
METHOD AND APPARATUS FOR JOINING
CONTACTS FOR CONTACT CARRIERS
Helmut Moll, Nuremberg, Germany, assignor to Siemens
Aktiengesellschaft, a corporation of Germany
Filed Apr. 20, 1967, Ser. No. 632,439
Claims priority, application Germany, Apr. 21, 1966,
S 103,301
Int. Cl. B23k 27/00
U.S. Cl. 29—470.1                                      9 Claims

ABSTRACT OF THE DISCLOSURE

A method and apparatus wherein a contact which is made of a material which is highly resistant to welding is joined with a contact carrier without using any intermediate material which can be easily soldered or welded. The contact material is fed to the vibrator of an ultrasonic device, and this vibrator has a working head provided with a recess which determines the final configuration of the contact. By the simultaneous application of pressure and ultrasonic energy the contact material is welded to the contact carrier while being provided with a predetermined contact configuration. The contact material which is fed to the vibrator of the ultrasonic device can be in the form of a suitable blank, or the contact material may be fed to the vibrator in layer form, having the configuration of a sheet or a relatively narrow strip or even a band of relatively great width. In this latter case the working head of the vibrator of the ultrasonic device is provided at the edge of its recess which determines the congfiuration of the contact with a cutter construction which serves to cut the contact material from the layer which is fed to the vibrator.

---

My invention relates to the joining of contacts to contact carriers.

In particularly, my invention relates to joining to a contact carrier a contact body which is made of a weld-resistant material.

Electrical contacts, because they should have a certain resistance to welding, as well as a certain strength with respect to being burned away and a certain adhesive strength, are subjeced to requirements which can be simultaneously fulfilled only with great difficulty. When a pair of electrical contacts are pressed against each other under a given current load, these contacts must not become welded to each other, and thus it is essential to use as material for the contacts a material which is highly resistant to welding. Experience has shown, however, that contact material which is highly resistant to welding does not possess the property of being easily soldered and/or welded. This is the type of material which is referred to as being highly resistant to welding. Such contact materials are those which while being highly resistant to welding at the same time have a low propensity for being welded to other materials. The weld resisting materials are AgCdO, Ag-SnO₂, Ag-Ni-CdO, Ag-Ni-MgO, Ag-Cu-CdO, Ag-CdO-SnO₂, Ag-CdO-Al₂O₃, and other silver-metal oxide compounds which are contact material which have poor adhesion and welding properties.

Up to the present time it has been attempted to join contacts of this type of material to contact carriers by providing the contact body with an intermediate layer of a material which can be easily soldered, and then such a contact body is soldered to the contact carrier.

Thus, it is known to render compounds with metal oxide additions solderable by plating the contact material with a layer of silver having a thickness on the order of 20–200μ, this silver layer being soldered in the same way as silver to the contact carrier. In this way it is possible to solder AgSnO₂ and Ag-CdO₃ contact materials with copper contact carriers.

Also, it is known to solder contact materials made of non-solderable compounds with contact carriers of easily soldered metal by providing the contact body at its surface which is directed toward the contact carrier with an easily soldered porous layer which during the manufacture of the contact body is pressed and sintered in common therewith and has a mechanical toothed connection with the contact body.

Moreover, there is still another solution for joining to a contact carrier a contact body made of a material which has a high resistance to welding. According to this latter solution a sintered contact body composed of at least two layers is provided, one of these contact layers which is made of a contact material which is highly resistant to welding, being sintered together with the other layer which is made of a material which can be easily welded, such as, for example, iron, nickel, or Monel-metal. Such contact bodies are manufactured according to known powder metallurgy methods.

It is a primary object of my invention to provide a method and apparatus for joining to a contact carrier a contact body made of a material which is highly resistant to welding without requiring any additional intermediate layers of the like of a material which can be easily soldered or welded.

Thus, it is an object of my invention to provide a method and apparatus which will save the costs involved in the material and manufacturing expenses required by the use of such additional materials.

Also, it is an object of my invention to provide a method and apparatus for joining a contact to a contact carrier in such a way that the contact carrier will retain its hardness and its resilient properties while eliminating additional heating of the contact as is required with known methods where the contact is soldered and resistance-welded to the contact carrier.

Furthermore, it is an object of my invention to provide a contact body which is homogeneous to such an extent that there are no localized portions where heat accumulates, as is the case with conventional structures having layers of easily welded or soldered material, so that in this way the life of the contact of my invention is greatly increased as compared to the life of conventional contacts which is reduced because of the presence of localized areas where heat accumulates.

Furthermore, the objects of my invention include the provision of a method and apparatus which will eliminate the inconvenience and costs involved in premanufacturing of contact bodies before they are joined to the contact carrier.

In addition, it is an object of my invention to provide a method and apparatus which do not require any special structure for feeding the contact material to the contact carrier to be joined thereto.

The objects of my invention also include the provision of a method and apparatus which will eliminate all losses of the expensive contact material.

Yet another object of my invention is to provide a method and apparatus of the above type which can to a very large extent be automated.

In accordance with my invention, the above objects and problems are solved by feeding to the vibrator of an ultrasonic device contact material for a contact body of the above type, and welding the contact material to a contact carrier while providing the contact material with a predetermined contact configuration during simultaneous application of pressure and ultrasonic energy to the contact material. In this way the requirement of using an intermediate layer of a material which is easily soldered or welded is eliminated, and at the same time the contact carrier can retain its hardness and resilient properties without requiring any additional heating thereof. There are, with my invention, no localized areas where heat can accumulate undesirably, so that the life of the contact of my invention is not decreased by the presence of such areas. The contact material can advantageously be fed to the vibrator of the ultrasonic device in the form of a blank, and the predetermined configuration of the final contact can be pressed into the contact material by the vibrator itself during the welding of the contacts to the contact carrier. In this way it is possible to eliminate the inconvenient and expensive preforming of the contact body. The blank contact body can simply be separated from a wire or rod and fed to the vibrator.

It is possible to further simplify the method of my invention by feeding the contact material to the vibrator of the ultrasonic device in the form of a layer, in band or sheet form, and cutting the contact body from such a layer of contact material during the welding of the contact body to the contact carrier. Thus, as a part of the method of pressing the contact material into a predetermined contact configuration and welding it to the contact carrier, the contact material is also cut from the layer which is fed to the vibrator. In this way it is possible to eliminate all preliminary steps for achieving a contact blank which is to be fed to the contact carrier, and it thus becomes also possible to eliminate any special structure for feeding the vibrator with the material which is to be worked on. In addition, a simple and reliable feeding of the contact material to a predetermined part of the contact carrier is assured. By providing the working head of the vibrator, which acts as a cutting and shaping tool, with a suitable cutting profile, it is possible to eliminate all loss of the expensive contact material. The layer which is fed to the vibrator of the ultrasonic device can be advanced toward the latter during the course of the operations of joining the contact to the contact carrier, so that in this way the method of my invention can be automated to a very large extent.

Further details and advantages of my invention will be apparent from the description below of different embodiments of my invention.

My invention is illustrated by way of example in the accompanying drawings which form part of this application and in which:

FIGS. 1A, 1B, and 1C illustrate various method steps during the manufacture of a connection between a contact and a contact carrier, in accordance with my invention, the contact body of this embodiment being in a semifabricated form;

FIG. 2 is a schematic side elevation of a device of my invention for carrying out the method of my invention with a layer of contact material;

FIG. 3 is a partly sectional front elevation of the structure of FIG. 2;

FIG. 4 is a fragmentary schematic side elevation of another embodiment of a device according to my invention for carrying out the method of my invention, providing in this case a contact body of rectangular or square form; and FIG. 5 is a partly sectional front elevation of the structure of FIG. 4.

Referring now to FIG. 1A, there is schematically illustrated therein the vibrator 1 of an ultrasonic device which is not further illustrated. The vibrator 1 can, in a known way, take the form of a magnetostrictive or electrostrictive longitudinal vibrator. The double-headed arrow A of FIG. 1 schematically indicates the amplitude of the vibrator 1, while the arrow P indicates the direction of the pressure force. The contact body 2 is illustrated in FIG. 1A situated on a contact carrier 3. The contact body 2 can advantageously take the form of a single-layer body which is separated from a wire or rod or which is fed to the vibrator 1, either mechanically or by hand, in the form of a pre-finished blank having a body of predetermined profile.

As may be seen from FIG. 1B, the height H of the contact body 2 is advantageously greater than the depth T of the recess 4 which is formed in the working head of the vibrator 1. In this way the pressure force P can be effectively transmitted to the contact body 2, so that this contact body 2 will be given a predetermined contact configuration. The exterior contact surface can be either smooth, rough, flat, or curved. As a result of the vibratory action and the pressure applied to the body 2 by the vibrator 1, the body 2 is directly welded to the carrier 3 and receives the configuration determined by the configuration of the recess 4, so that the finished contact will have the configuration indicated schematically in FIG. 1C where the contact 2 has a height $H_K$ and a diameter $D_K$, this contact 2 of predetermined configuration which is shown in FIG. 1C having the shape of a truncated cone, conforming to the shape of the recess 4.

As compared to known ultrasonic treating methods, the contact pressure P is relatively high and preferably is greater than 150 kg. where the finished contact, as shown in FIG. 1C, has a diameter of approximately 2.5 mm. In this way not only is the oxide layer which tends to adhere to the outer surface of the contact body and/or the contact carrier eliminated, and a plastic flow of the materials which are to be joined to each other reliably achieved at the location where the joint is to be provided, but in addition the working of the outer surface of the contact body 2 is increased in the manner desired, so that the contact body can be manufactured with, for the most part, any desired predetermined configuration. It is, however, also possible to press the contact material into an intermediate configuration of predetermined profile so that thereafter it will be provided with its final predetermined contact configuration in a subsequent operating step. The contact materials which can be worked on with the device and method of my invention are preferably metal-metal-oxide compounds, such as Ag-CdO, Ag-SnO2, Ag-Ni-CdO, Ag-Ni-MgO, Ag-Cu-CdO, Ag-CdO-SnO$_2$, Ag-CdO-Al$_2$O$_3$, and also metal-metal compounds of great resistance to welding. As a contact material with a particularly high resistance to welding silver-cadmium-oxide is frequently used for the contact. With my invention it is not only possible to weld sintered silver-cadmium-oxide, but also materials having the form of a silver-cadmium alloy and wherein the cadmium is subsequently converted by oxidation into an oxide. The percentage of cadmium-oxide in this case will in general be between 5 and 12% by weight, preferably 10% by weight.

In order to further explain the method shown in FIGS. 1A–1C, an example of this method is as follows:

Contact material: Ag-CdO (90%:10%)
Blank dimensions:
    H _____ mm__ 1
    D _____ mm__ 1.8
Finished dimensions:
    $H_K$ _____ mm__ 0.4
    $D_K$ _____ mm__ 2.8
Welding pressure:
    P _____ kg__ 190
Frequency _____ kHz__ 22
Welding time _____ sec__ 1
Power consumed by the ultrasonic vibrator __w__ 1000

FIGS. 2–5 illustrate the active components of an ultrasonic device having a vibrator or sonotrode 1. The layer 2a of contact material, in the form of a band or sheet, is fed to the sonotrode 1 engaging the upper surface of the contact carrier 3. In order to support the work material while it is treated by the ultrasonic device, as well as to absorb the forces of the sonotrode 1, an anvil 5 is provided, the contact carrier 3 directly engaging the anvil while the contact layer 2a is situated on the carrier 3 and the sonotrode 1 is situated over the layer 2a. The vibrator or sonotrode 1 has a working head 6 which advantageously forms a cutting and shaping tool and is provided with a recess 4 having the dimensions of the predetermined contact configuration which is to be manufactured. This recess 4 can have any desired profile, since the welding pressure P is so great that the contact material 2a can be cut out and shaped in the desired manner. This result is achieved in particular in the case where the edge of the working head 6 which limits the recess 4 has the construction of a cutter 7. The contact material 2a can take the form of an endless, strip-shaped or relatively wide band or it may take the form of a sheet. The thickness of this layer of contact material 2a is advantageously somewhat less than the maximum depth of the recess 4 of the working head 6 of the sonotrode 1. In this way not only will the contact which is to be manufactured be reliably cut out of the layer of contact material, but in addition it will be shaped to the predetermined contact configuration as is required for the joining of the contact to the contact carrier. The contact material can be any of the above-mentioned compounds or also the above-mentioned metal-metal compounds which have low propensities for adhesion and welding. In order to achieve a high efficiency in the transmission of the vibratory energy to the components which are to be joined to each other, the anvil 5 can advantageously be roughened at its exterior surface, for example by having recesses formed either by sandblasting or by suitable serrations which extend transversely with respect to the vibratory direction of the sonotrode.

Of particular significance for the method of my invention is the fact that the static pressing force P and the friction energy of the vibratory sonotrode 1 act, during the method, simultaneously on the contact material 2a. As a result, that part of the contact material 2a on which the working head 6 of the sonotrode 1 directly acts is placed in a plastic condition so that the required shaping work performed by the working head 6 is rendered correspondingly easier. This feature brings with it the advantage of subjecting the cutter 7 of the working head 6 of the sonotrode 1 only to a small amount of wear.

In the embodiment of my invention which is illustrated in FIGS. 4 and 5, those components which are the same as those of FIGS. 2 and 3 are designated by the same reference characters. The cutting edge 7 of FIGS. 2 and 3, which extends along the periphery of the recess 4, is of circular configuration while the recess 4 of FIGS. 2 and 3 forms part of a sphere, so that the resulting contact derived with this embodiment of the invention will also form part of a sphere. However, in the case of FIGS. 4 and 5, the limiting edges of the recess 4 have straight portions forming the cutter 7, so that with the embodiment of FIGS. 4 and 5 a non-circular contact is achieved. This contact is preferably of a rectangular or square configuration and the cutting edges 7 include a pair of opposed parallel straight portions situated at opposite sides of the recess 4 at the periphery thereof. Thus, the cutting line provided with the working head 6 of FIGS. 4 and 5 will form from the layer of contact material 2a a contact which is advantageously rectangular or square. In this way, it is possible to separate from the layer 2a portions thereof which will form the final contact and which are not subjected to a cutting action before being joined with the contact carrier 3. In other words, where the recess 4 of FIGS. 4 and 5 forms part of a cylinder, there will be a pair of opposed straight parallel cutting edges 7, but no cutting edges will be required between these straight parallel cutting edges, as is apparent from FIG. 5, and it is only required that the width of the layer 2a, which takes the form of a strip or band having the width shown in FIG. 5, be no greater than the length of the cutting edges 7. In this way these cutting edges can cut completely across the strip 2a, separating the latter from the rest of the layer 2a, and requiring cutting from the layer 2a only along part of the periphery of the final contact.

Thus, with the embodiments of FIGS. 4 and 5 the final contact will also have a configuration determined by the configuration of the recess 4, but in this case the final contact will have the form of part of a cylinder.

It is apparent that with the device and method of my invention it is also possible to use for the layer of contact material pre-manufactured contact strips which include a plurality of contact bodies joined together in one or more rows and interconnected by means of easily separated lugs which extend between the successive contact bodies. In this case it is sufficient if that part of the working head of the sonotrode which acts as a cutter takes the form of a simple knife in order to cut through the connecting lugs of such a series of pre-manufactured contact bodies. It is important, however, that these pre-finished contact bodies of such a strip or row of contact bodies have dimensions which change during formation of the contact into its final predetermined configuration while it is joined to the contact carrier. This result can be achieved in the simplest possible way by giving to the recess of the sonotrode a configuration such as that of FIG. 2, for example, where it forms part of a sphere, while the sides of the pre-finished contact body are given a flat configuration.

In order to further illustrate the embodiment of FIGS. 2 and 3, the following data used in a specific example is given:

Contact material Ag-CdO (90%:10%)
Contact material thickness _____ mm__ 0.3
Contact body dimensions: (circular contact made by the working head of FIGS. 2 and 3)
    Maximum diameter _____ mm__ 2.8
    Maximum depth _____ mm__ 0.4
Welding pressure
    P _____ kg__ 190
Frequency _____ kHz__ 22
Welding time _____ sec__ 1
Power consumed by the ultrasonic vibrator ___w__ 1500

I claim:
1. A method of joining to a contact carrier a contact body made of a weld-resisting contact material, comprising the steps of feeding the contact material to the vibrator of an ultrasonic device and welding the material to the contact carrier while shaping the material to a predetermined contact configuration during simultaneous application of contact carrier deforming pressure of greater than 150 kg. and ultrasonic energy to the material.

2. A method as recited in claim 1 and wherein the contact material has the form of a blank when fed to the vibrator of the ultrasonic device while the predetermined contact configuration is provided by shaping pressure of the vibrator of the ultrasonic device during welding of the material to the contact carrier.

3. A method as recited in claim 1 and wherein the contact material is fed in layer form to the vibrator of the ultrasonic device and while being joined to the contact carrier is cut from the layer, shaped to said predetermined configuration, and welded to the contact carrier.

4. A method as recited in claim 1 and wherein the contact material has the form of a single layer when fed to the vibrator of the ultrasonic device.

5. A method as recited in claim 4 and wherein the contact material is a metal-metal-oxide compound.

6. A method as recited in claim 5 and wherein the contact material is silver-cadmium-oxide.

7. A method as recited in claim 3 and wherein said layer is fed to said vibrator in timed relationship with respect to the joining of the contact to the contact carrier by the vibrator.

8. A method as recited in claim 1 and wherein said vibrator is formed with a recess in which the material is provided with said predetermined contact configuration, said material when fed to said vibrator having a thickness greater than the depth of said recess.

9. A method as recited in claim 1 and wherein said vibrator is formed with a recess in which the contact material is shaped to said predetermined contact configuration, and said material, when fed to said vibrator, having a thickness which is less than the maximum depth of said recess.

References Cited
UNITED STATES PATENTS

| | | | |
|---|---|---|---|
| 3,371,414 | 3/1968 | Gwyn | 29—470.1 XR |
| 3,336,655 | 8/1967 | Rozmus | 29—470.1 |
| 3,330,026 | 7/1967 | Best et al. | 29—470.1 |
| 3,151,385 | 10/1964 | Gwyn | 29—630 |
| 2,882,588 | 4/1959 | Rieppel et al. | 29—470.1 XR |
| 2,779,998 | 2/1957 | Bailey | 29—475 XR |
| 2,703,997 | 3/1955 | Sowter | 29—475 XR |
| 2,697,954 | 12/1954 | Sowter | 29—470.1 |
| 2,554,328 | 5/1951 | Grimes | 29—482 XR |
| 1,872,193 | 8/1932 | Stresau | 29—482 XR |

JOHN F. CAMPBELL, Primary Examiner

RICHARD BERNARD LAZARUS, Assistant Examiner

U.S. Cl. X.R.

29—475, 482